United States Patent [19]

Morgan

[11] 3,919,646

[45] Nov. 11, 1975

[54] SCANNING RECEIVER

[75] Inventor: Eugene L. Morgan, Lincoln, Nebr.

[73] Assignee: Hy-Gain Electronics Corporation, Lincoln, Nebr.

[22] Filed: May 6, 1974

[21] Appl. No.: 467,456

[52] U.S. Cl. .................... 325/470; 325/492
[51] Int. Cl.$^2$ .................... H04B 1/32
[58] Field of Search .................... 325/470, 478, 492; 315/360; 334/86, 87

[56] References Cited

UNITED STATES PATENTS

| | | | |
|---|---|---|---|
| 3,488,596 | 1/1970 | Webster et al. | 325/492 |
| 3,599,100 | 8/1971 | Ward | 325/492 |
| 3,603,884 | 9/1971 | Zaura et al. | 325/478 |
| 3,665,318 | 5/1972 | Hoffman | 325/470 |
| 3,725,674 | 4/1973 | Schaeffer et al. | 325/478 X |
| 3,824,475 | 7/1974 | Pflasterer | 325/470 |

FOREIGN PATENTS OR APPLICATIONS

| | | | |
|---|---|---|---|
| 1,143,245 | 2/1963 | Germany | 325/492 |

*Primary Examiner*—Benedict V. Safourek
*Assistant Examiner*—Robert Hearn
*Attorney, Agent, or Firm*—Vincent L. Carney

[57] ABSTRACT

To permit a scanning receiver to automatically or manually scan a plurality of crystals of a local oscillator, a counter receives short-duration timing pulses, with the coincidence of certain of the timing pulses and a signal derived from the squelch circuit in the automatic mode causing the counter to step from position to position, energizing a different crystal at each position, the stepping in the manual mode only occurring when a push-button switch is closed. To conserve power, indicator lamps and, in one embodiment, other portions of the receiver such as the IF and audio portions of the receiver are energized with timing pulses during scanning, with the timing pulses being relatively short in duration.

9 Claims, 4 Drawing Figures

SCANNING RECEIVER

This invention relates to scanning receivers.

In one class of scanning receiver, the scanning circuitry includes a counter, a pulse generator, an array of crystals that are each connectable in circuit with the same oscillator circuitry, an array of indicator lamps, each of which corresponds to a different one of the crystals, and manual-automatic mode selection circuitry. The oscillator circuitry and a selected one of the crystals form the local oscillator of the receiver so that, as the counter steps from position to position under the control of clock pulses, successive crystals are energized to interact with the oscillator circuitry and provide oscillations to the RF amplification and first mixer stages of the receiver.

When a carrier frequency is received at one of the frequencies being scanned, the RF mixer provides a signal which is processed by the IF and audio stages of the receiver resulting in a signal to the speaker and to the squelch control circuit, with the squelch circuit providing a signal that terminates the scanning. The manual-automatic mode selection circuitry terminates the automatic scanning when it is in the manual mode and permits the counter to be stepped by depressing a manual switch.

In a prior art type of scanning receiver of this class, the manual-automatic mode selection circuitry disables the source of clock pulses and permits individual pulses to be generated with a manual switch to step the counter. The outputs from the counter and associated amplifiers illuminate the lamps and energize the crystals simultaneously for the same period of time, with the IF and audio circuitry being energized continuously.

This prior art type of scanning receiver has several disadvantages, such as: (1) it consumes a relatively large amount of power and therefore, in a portable unit, discharges the batteries in a relatively short time; (2) the circuit is complicated by a requirement for a separate timing source to be used during manual operation since the clock pulse generator is deenergized; (3) several expensive power switching transistors are required in the scanning circuitry because of the large power requirements of the lamps; and (4) contact bounce or the like causes spurious switching under some circumstances.

Accordingly, it is an object of the invention to provide a novel scanning radio.

It is a further object of the invention to provide a scanning radio which utilizes a relatively small amount of electrical power.

It is a still further object of the invention to provide a scanning radio in which the source of timing pulses for automatically scanning is used for other purposes during manual scanning.

It is a still further object of the invention to provide a scanning radio in which power is consumed by performing certain operations periodically.

It is a still further object of the invention to provide a scanning radio receiver in which the scan control circuitry includes an integrated circuit counter controlled by clock pulses.

It is a still further object of the invention to provide a scanning radio in which the pulses that select different frequencies are of longer durations than the pulses that illuminate the lamps to indicate the channel being scanned.

It is a still further object of the invention to provide a scanning radio in which the scan control circuitry is free of power transistors.

In accordance with the above and further objects of the invention, the scanning circuitry of a scanning radio receiver includes an oscillator common circuit connected to the first mixer, a plurality of crystals which separately cooperate with the oscillator common circuit, a counter having different outputs connected to corresponding ones of the crystals, a pulse generator, a plurality of channel-indicating lamps and manual-automatic mode selection circuitry.

To indicate the channel that the scanner is trying to receive, a different LED is connected to each crystal corresponding to a channel, to be intermittently illuminated when the counter is energizing the corresponding crystal for that channel.

To enable the scanning radio to scan different channels automatically or manually: (1) the output of the manual-automatic mode selection circuitry is connected to the count input terminal of the counter; and (2) the squelch circuit of the receiver and a pulse generator having a ten-to-one duty cycle are connected to the input terminal of the manual-automatic selector switch. In the manual mode, the squelch signal is rendered ineffective to allow or stop scanning and timing pulses are applied to the count input terminal of the counter only when a manual push-button switch is depressed. In one embodiment, the closing of a push-button switch in the manual mode triggers a Schmidt trigger, which applies a pulse to the counter to step one channel.

To conserve power, the pulse generator applies short pulses to the LED's to energize them only during a portion of the time the crystal is energized and, in one embodiment, provides pulses to a power switch that controls the power applied to the IF and audio stages of the receiver so that the LED's, IF stage and audio stage of the receiver use a minimum amount of power.

From the above description, it can be understood that this invention has several advantages such as: (1) the timing pulses may be used for more than one operation during the scanning of the channels; (2) the receiver uses less power so that, in portable receivers, the batteries last longer; (3) it is not necessary to include power transistors for switching operations in the scanning circuit; and (4) in the manual mode, the generation of scanning pulses does not cause spurious switching because, in one embodiment, the Schmidt trigger saturates on the first pulse applied through the push-button switch and thus does not pass subsequent pulses that may be caused by contact bounce, and in another embodiment, manual scanning is at a slow rate after a push button is depressed, thus reducing the effects of contact bounce.

The above-noted and other features of the invention will be better understood from the following detailed description when considered with reference to the accompanying drawings, in which.

GENERAL STRUCTURE

Figure 1:
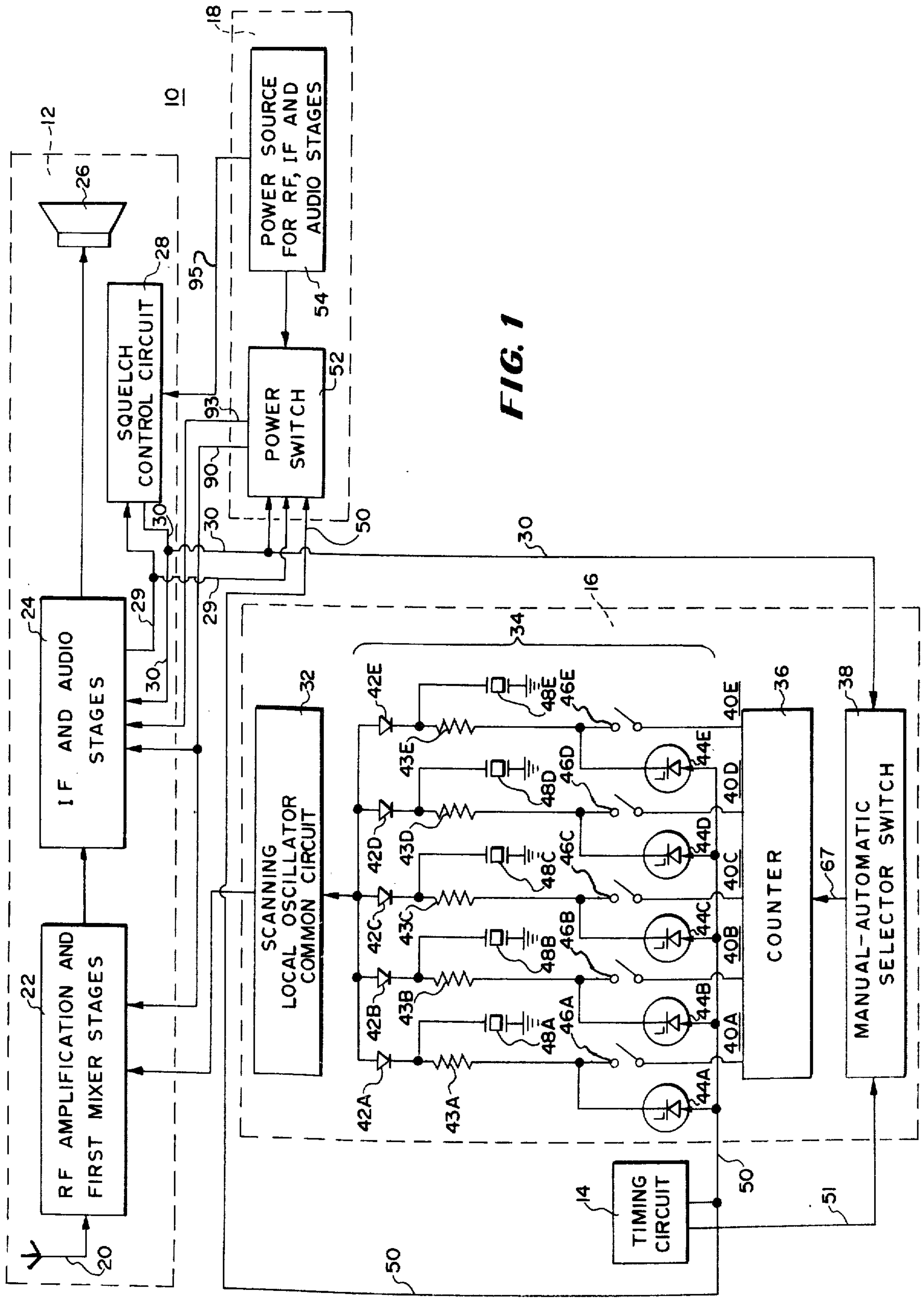
FIG. 1 is a block diagram of a scanning receiver including an embodiment of the invention.

In FIG. 1, there is shown a scanning receiver 10 having a basic receiver section 12, a timing circuit 14, a frequency scanning section 16, and a receiver power control section 18.

To receive radio signals and provide audio information, the basic radio section 12 includes an antenna 20, RF amplification and first mixer stages 22, IF and audio stages 24, a speaker 26, and a squelch control circuit 28, with the RF amplification and first mixer stages 22 being connected to the antenna 20 to receive modulated carrier frequencies which are amplified and mixed with signals from the local oscillator and applied to the IF and audio stages 24 for further amplification and transmission to the speaker 26, the squelch circuit 28 being connected to the discriminator within the IF and audio stages 24 through a conductor 29 to provide squelch control and to develop a signal on conductor 30 when a carrier is received.

To enable the scanning receiver 10 to scan across a plurality of discrete frequencies until it receives a modulated carrier, the frequency scanning section 16 includes a scanning local oscillator common circuit 32, a discrete-frequency signal-generating array 34, a counter 36, and a manual-automatic selector switch 38, with the counter 36 being connected to the manual-automatic selector switch 38 to: (1) in the automatic mode, automatically select different elements of the array 34 in periodic succession at a relatively high rate of 1.4 Hz. until an element of the array 34 is selected which represents a carrier being received on the antenna 20; or (2) in the manual mode, step one step at a time at a lower rate of 0.3 Hz. in one embodiment or step one step only in another embodiment to energize the succession of elements of the array 34 when a manual push button of the manual-automatic selector switch 38 is depressed. The counter operates as a ring counter and many known suitable circuit arrangements are usable, one such arrangement being briefly described in connection with FIG. 2.

To inhibit scanning when a carrier is received on one of the channels being scanned, the manual-automatic selector switch 38 is connected to the output of the squelch control circuit 28 through the conductor 30 to apply a squelch signal to the manual-automatic selector switch 38 when a carrier is received.

To provide a succession of different discrete frequencies to the RF amplification and first mixer stages 22 of the basic radio receiver portion 12 of the scanning receiver 10, the signal generating array 34 includes a plurality of channels, five channels 40A–40E being shown in FIG. 1 for purposes of explanation, with each of the channels being connected at one end to a different output of the counter 36 and at the other end to the input of the scanning local oscillator common circuit 32, the output of the scanning local oscillator common circuit 32 being connected to an input of the mixer within the RF amplification and first mixer stages 22.

Each of the channels 40A–40E includes: (1) a corresponding one of the lamps 44A–44E to indicate the frequency being provided to the mixer in the RF and first mixer stages 22; (2) a corresponding one of the crystals 48A–48E to cause the scanning local oscillator common circuit 32 to provide the selected discrete frequency; (3) a corresponding one of the manual switches 46A–46E to lock out a selected channel so that the frequency corresponding to this channel is not scanned; (4) a corresponding one of the switching diodes 42A–42E; and (5) a corresponding one of the resistors 43A–43E.

In each of the channels, the switch 46, resistor 43, and switching diode 42 are connected in series in the order named between a corresponding output of the counter 36 and the input to the scanning oscillator common circuit 32, with the anode of the diode 42 being connected to the scanning local oscillator common circuit 32 and the crystal 48 connected between the cathode of the switching diode 42 and ground. Each lamp 44 is connected at one end between a corresponding crystal 48 and switch 46 and at its other end to the conductor 50.

To reduce the power consumption of the scanning receiver 10, the receiver power control portion 18 in the embodiment of FIG. 1 includes a power switch 52 and a source of electrical power 54. The power switch 52 receives signals on the conductors 29, 30 and 50, which signals control the application of electrical power from the power source to the RF amplification and first mixer stages 22 and to the IF and audio stages 24, so that the RF and IF amplifiers and first and second mixers utilize power only for 6 millisecond durations of the 66 milliseconds of time that one of the crystals 48 is energized to test for a carrier frequency and during substantially the entire time a carrier is being received, with the audio stage, except for the discriminator and the squelch control being off unless a carrier is received.

To control the timing of the frequency scanning portion 16 and the receiver power control portion 18, the timing circuit 14 has it outputs connected to: (1) the discrete frequency-providing array 34 and the power switch 52 through conductor 50; and (2) the manual-automatic selector switch 38 through conductor 51. The timing circuit 14 in the preferred embodiment is an astable multivibrator having a ten-to-one duty cycle with a short-duration positive pulse output being applied to conductor 50 and a longer negative output pulse being applied to conductor 51. However, other suitable circuits are known to persons skilled in the art.

GENERAL OPERATION

Before operating the scanning receiver 10, the crystals 48 are selected and inserted in the discrete frequency-providing array 34. The crystals are selected to cooperate with the scanning local oscillator common circuit 32 so that each crystal causes the scanning local oscillator common circuit to oscillate at one predetermined frequency desired for that geographic location in which the scanning receiver is to be used when a crystal 48 is energized. For example, in certain geographic areas a frequency of 174 megacycles is used by certain emergency vehicles so that a police scanning receiver may include as one of the crystals 48 a crystal that, when energized, resonates together with the scanning local oscillator 32 at 174 megacycles.

After the crystals have been selected and inserted, certain of the switches 46 are closed and others are open with the closed switches selecting the particular frequencies that are to be scanned at that time while the opened switches are not scanned. These switches are manual and therefore provide some flexibility to the operator without the necessity of changing crystals. Also, the manual-automatic switch is manually switched to either the manual or automatic mode of operation.

To select manual or automatic scanning, the manual-automatic selector switch 38 includes a manual two-position switch, which in one position causes the counter 36 to ground a succession of its output terminals under the control of the 6 millisecond duration pulses from the timing circuit 14 and in another position prevents the counter 36 from stepping unless a manual push-button switch in the manual-automatic selector switch 38 is depressed.

In operation, the frequency scanning portion 16 provides a succession of different discrete frequencies to the RF amplification and first mixer stages 22 and the RF amplification and first mixer stages receive any carrier frequencies that are present from antenna 20. When an audio-modulated carrier frequency is received corresponding to a discrete frequency applied to the mixer in the RF amplification and first mixer stages 22, it is detected and applied to the IF and audio stages 24 which processes it to provide an audio signal to the speaker 26 and a signal to the squelch circuit 28. The squelch circuit 28 provides a signal to the frequency scanning portion 16 to terminate the scan whenever the carrier frequency is received so that any audio information that is present on the carrier is applied to the speaker 26. During the scan, power is conserved by pulsing the lamps 44, the RF amplification and first mixer stages 22, the second mixer and the IF stage with pulses of relatively short duration and by not turning on the audio stage until after a carrier is received.

To generate the succession of discrete frequencies as the counter 36 steps from position to position, the counter grounds one side of the corresponding ones of the resistors 43 through closed switches 46 so that the crystals 48 are successively energized by the potential from the scanning local oscillator 32 as the counter 36 steps from position to position. The energizing of one of the crystals 48 completes a circuit through the local oscillator common circuit 32 to cause it to oscillate at a different frequency for each of the crystals 48A–48E, thus providing a plurality of discrete frequencies to the RF amplification and first mixer stages 22 as the counter 36 steps from position to position, with those frequencies being skipped for which a corresponding one of the switches 46 is open.

To cause a corresponding one of the lamps 44 to be illuminated when the local oscillator common circuit 32 provides a frequency controlled by a corresponding one of the crystals 48, the timing circuit 14 provides 6 millisecond duration pulses through the conductor 50 to terminals of the lamps 44, which in the preferred embodiment are LED lamps with their anodes connected to the conductor 50, so that as the counter 36 steps from position to position, a current path is formed from the timing circuit 14 through a lamp 44, the closed switch 46 and the output of the counter 36 which is currently grounded causing each of the lamps 44 to be energized a portion of the time during the energization of a corresponding one of the crystals 48. When the scanning is terminated because a carrier frequency has been received at one of the different frequenncies, the corresponding lamp 44 continues to be pulsed by pulses from the timing circuit 14.

Because the lamps are pulsed with 6 millisecond duration pulses during a scan rate of 1.4 Hz., less power is utilized in the lamps 44 than would be the case if they were continually illuminated during each scan pulse.

To receive radio signals, the antenna 20 receives and applies signals to the first mixer through an RF amplifier within the RF amplification and first mixer stages, which mixer also receives discrete frequencies in succession from the scanning local oscillator common circuit 32 of the discrete frequency scanning portion 16. The output from the mixer is then processed in a manner conventional in F.M., superheterodyne scanning receivers.

To hold or lock the discrete frequency scanning portion 16 when a carrier is received, the audio signal from the IF and audio stage 24 is applied to a squelch circuit 28 which: (1) turns on the audio amplifier to receive the incoming audio signal; (2) applies a signal through conductor 30 to the manual-automatic selector switch 38 to prevent further scanning; and (3) in one embodiment, applies a signal through the conductor 30 to close the power switch 52 and thus maintains power to the IF and audio stage 24 for reception of the audio signal.

To save power during scanning by the frequency scanning portion 16, the power switch 52 is closed during the periods of time that the crystals are energized during scanning by the timing circuit 14 and frequency scanning section 16 and during reception of a signal by the squelch circuit so that the RF amplification and first mixer stages 22, the IF and audio stage 24 and the squelch control circuit are on only when it is necessary to receive a signal and are turned off at other times, thus saving power. Although a single power switch is shown in FIG. 1 controlling several stages or components of a receiver, separate switches may be included instead to selectively control separate stages or components.

The lamps 44 in the preferred embodiment are LED devices which have low power consumption, but other types of lamps may be used, some types of which are combined with a diode to provide unidirectional conduction. The scanning radio 10, of course, may be either the type that holds position as long as the carrier is being received and continues scanning later or may lock in position until unlocked upon the reception of a carrier. Both types of circuits are known in the art and a person skilled in the art can modify the basic circuit disclosed in FIG. 1 to provide either type of circuit. Moreover, other types of indicators such as digital readout devices and the like may be used.

While in the preferred embodiment the scanning receiver utilizes separate crystals, each of which corresponds to a different channel, it is possible to use a frequency synthesizer incorporating a smaller number of crystals to provide a larger number of frequencies. With this modification, the counter controls the operation of the frequency synthesizer rather than selecting individual crystals, but otherwise the circuit operates as described with respect to crystals except for necessary design modifications which are routinely made by persons skilled in the art.

From the above description, it can be understood that the scanning receiver 10 has several advantages such as: (1) it is inexpensive in construction because the timing circuit 14 is able to control not only the scanning of the counter 36, but other logic functions during the scanning, such as the pulsing of the lamps 44 and the power switch 52; (2) it has low power requirements and therefore a portable unit has long battery life; (3) no expensive power-switching transistors are used in the scanner; and (4) it is less susceptible to spurious switching from contact bounce in the manual mode.

DETAILED STRUCTURE

Figure 2:
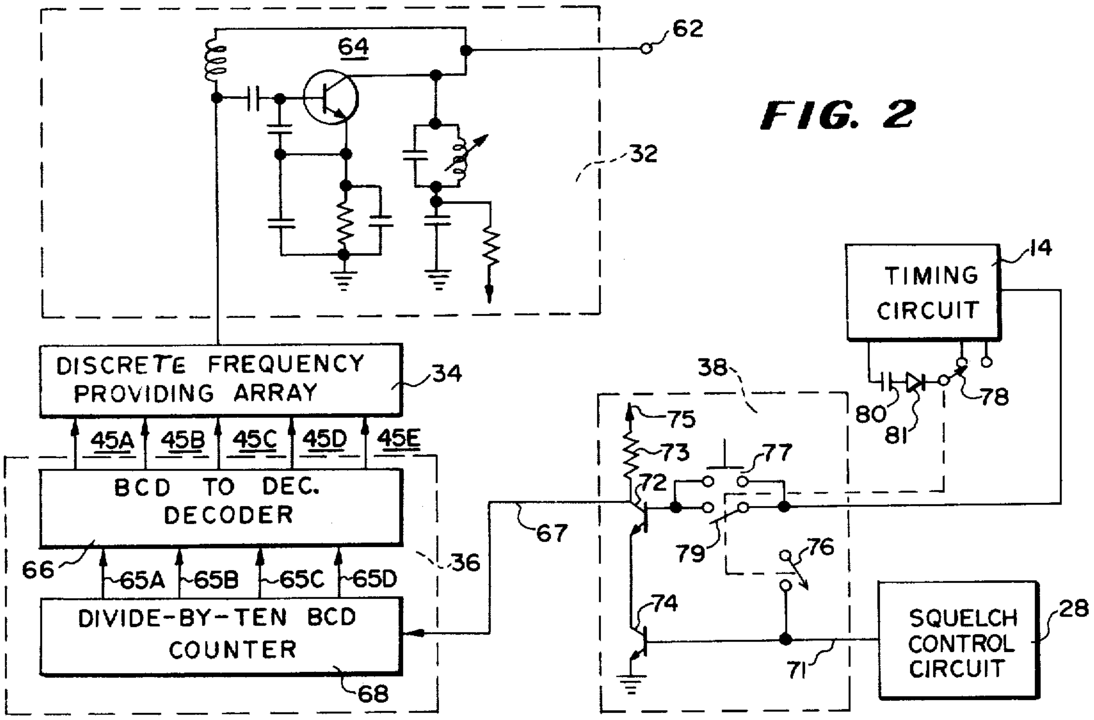
FIG. 2 is a schematic circuit diagram of a portion of the scanning receiver of FIG. 1.

In FIG. 2, there is shown a schematic circuit diagram of the scanning local oscillator common circuit 32, the discrete frequency-providing array 34, one embodiment of the manual-automatic selector switch 38, the timing circuit 14, squelch control circuit 28 and the dividing counter 36.

To apply a selected one of several discrete frequencies to the mixer within the RF amplification and first mixer stage 22 (FIG. 1), the scanning local oscillator common circuit 32 includes an output terminal 62 adapted to be connected to the mixer at one end and connected at the other end to a crystal controlled Colpitts oscillator 64, which Colpitts oscillator 64 is completed by a selected one of the crystals 48 (FIG.1) (FIG. 1) the discrete frequency-providing array 34 when that crystal is energized by the grounding of an output of the counter 36.

To scan the discrete frequency-providing array 34, the dividing counter 36, in the preferred embodiment, includes a binary-coded-decimal to decimal decoder 66 and a divide-by-ten binary coded decimal counter 68 having its input connected to the output of the manual-automatic selector switch 38 (FIG. 1) through a conductor 67 and having its outputs 65A–65D connected to the inputs of the decoder 66.

To select automatic or manual operation of the scanner in the embodiment of FIG. 2, the manual-automatic selector switch 38 includes a first NPN transistor 72 having its collector connected to a source of potential 75 through a resistor 73 and to conductor 67, a second NPN transistor 74 having its emitter grounded and its collector connected to the emitter of the first transistor 72, a first single-pole, single-throw switch 76, a second single-pole, single-throw switch 79 and a normally open push-button switch 77.

To set the manual-automatic selector switch 38 into the manual mode or into the automatic mode, the single-pole, single-throw switch 76 has one contact connected to the squelch control circuit 28 and to the base of transistor 74 and its other contact electrically connected to the output of the timing circuit 14, to one contact of the push-button switch 77 and to one contact of switch 79. The other contacts of the switches 77 and 79 are connected to the base of the transistor 72, with the armatures of the switches 76 and 79 being connected together so that the switch 79 is opened when the switch 76 is closed and the switch 79 is closed when the switch 76 is opened. The switches 76 and 77 are panel mounted.

With these connections, when switch 76 is switched to the manual (closed) position, the timing circuit 14 and the base of the transistor 72 are disconnected by open switch 79 unless the push-button switch 77 is depressed to permit timing pulses from the timing circuit 14 to drive the transistor 72 and when the switch 76 is in the automatic (open) position, the base of the transistor 72 is always connected to the timing circuit 14 through the closed switch 79. The squelch control circuit 28 controls the transistor 74 through conductor 71 to terminate the pulses being applied to the conductor 67 when a signal is received at one of the carrier frequencies being scanned by the scanning receiver 10 (FIG. 1) while the switch 76 is open.

To prevent automatic locking during manual scan when a carrier is received, the squelch control circuit 28 is connected to the output of the timing circuit 14 so that the switch 77, when closed, transmits the timing pulses to the conductor 67, to energize the divide-by-ten counter 68 regardless of the signal emanating from the squelch control circuit 28, this signal being held at the potential of the output of the timing circuit 14 by the input impedance of the timing circuit 14.

In the preferred embodiment, the timing circuit 14 is an astable multivibrator having a frequency of 1.4 Hz. and a ten-to-one duty cycle so that relatively short pulses of approximately 6 millisecond durations are normally generated and applied to: (1) the lamps 44 to pulse these lamps; and (2) in one embodiment, to the RF amplification and first mixer stages and the IF stages. 66 millisecond pulses are applied to the divide-by-ten BCD counter 68 to step this counter from position to position.

To reduce the frequency of scanning during manual operation, a switch 78 is connected to the switch 76 to be closed and opened therewith, the switch 78 connecting, when closed, a capacitor 80 and diode 81 in circuit with the cross-over capacitors of the multivibrator used in the timing circuit 14. Accordingly, when the switch 76 is closed in the manual position, the capacitor 80 and diode 81 are connected in series with each other and in circuit with the cross-over capacitor of the multivibrator to change its frequency to a repetition of 0.3 Hz. for manual scanning.

Figures 3, 4:
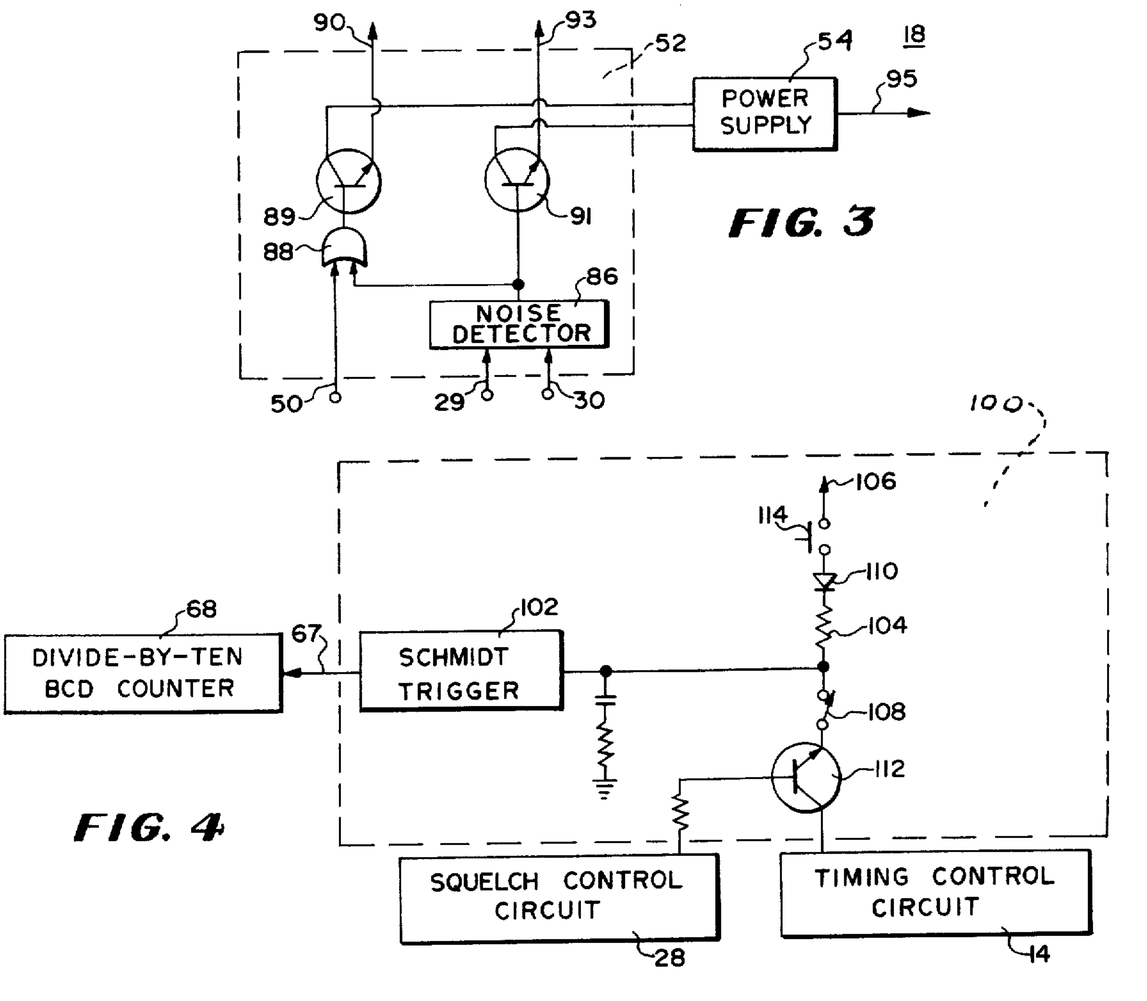
FIG. 3 is a logic diagram of still another portion of the scanning receiver of FIG. 1.
FIG. 4 is a schematic circuit diagram of a portion of another embodiment of the scanning receiver of FIG. 1.

In FIG. 3 there is shown a logic diagram of the power switch 52 having a noise detector 86, an OR gate 88, a first NPN transistor 89, and a scanning NPN transistor 91, with a first output conductor 90 being electrically connected to the emitter of the transistor 89 and a second output conductor 93 being electrically connected to the emitter of the transistor 91. The conductor 90 is electrically connected to the RF amplification and first mixer stages 22, the IF stage and the second mixer. The conductor 93 is connected to the audio stage to provide power to these stages under the control of the noise detector 86. A conductor 95 connects the power supply 54 directly to the squelch control circuit 28 and to the frequency scaning section 16 (FIG. 1).

The base of the transistor 89 is connected to the output of the OR gate 88, with one input of the OR gate 88 being connected to the timing circuit 14 through conductor 50 to drive this transistor to conduction for 6 milliseconds out of each 66 millisecond time period when no carrier is being received, the other input of the OR gate 88 being connected to the output of the noise detector 86 to maintain the transistor 89 conducting while a carrier is being received. The base of the transistor 91 is connected to the output of the noise detector 86 to drive this transistor to conduction only when a carrier is received. The noise detector 86 is a flip-flop having one input connected to the squelch circuit 28 through conductor 30 and its other input to the discriminator through conductor 29 to apply an output signal when a carrier is present, being set by the signal from the squelch control circuit 28 and reset by the noise from the discriminator.

In FIG. 4, there is shown another embodiment of manual-automatic selector switch 100 connected in a similar manner as the embodiment of the manual-automatic selector switch 38 (FIG'S. 1 and 2) to the divide-by-ten counter 68, the squelch control circuit 28, and the timing circuit 14. The manual-automatic selector switch 100 includes a resistor 104, a source of power 106, a single-pole, single-throw switch 108, a diode 110, an NPN transistor 112, a push-button switch 114 and a Schmidt trigger 102.

To cause the divide-by-ten BCD counter 68 to count without being affected by contact bounce or other noise pulses that closely follow a count pulse, the Schmidt trigger 102 has its output connected to the input of the divide-by-ten BCD counter 68 and its input connected to one contact of the switch 108 and one end of the resistor 104. The Schmidt trigger is fired by the first pulse and masks other closely following pulses.

To select automatic operation, the single-pole, single-throw switch 108 electrically connects the emitter of the transistor 112 to the input of Schmidt Scmidt trigger 102 when closed, with the transistor 112 having its collector connected to the timing circuit 14 and its base connected to the squelch control circuit 28 to apply a pulse to the Schmidt trigger 102 for each timing pulse while no carrier is being received and to block timing pulses while a carrier is being received.

To select manual operation, the single-pole, single-throw switch 108 disconnects the transistor 112 from the Schmidt trigger 102 when open so that the input of the Schmidt trigger 102 is only electrically connected in series with the following components in the order named, which are: (1) the resistor 104; (2) the diode 110 through its reverse impedance; (3) the normally-open push-button switch 114; and (4) the source of potential 106.

To apply pulses to the divide-by-ten counter 68 each time the push-button switch 114 is closed when the manual-automatic selector switch 100 is in the manual position, the input of the Schmidt trigger 102 is electrically connected to the source of positive potential 106 through the diode 110 and resistor 104 each time the push-button of the push-button switch 114 is depressed thus causing the Schmidt trigger 102 to apply one pulse to the divide-by-ten BCD counter 68.

DETAILED OPERATION

Before operating the scanning receiver 10, certain steps are usually taken, such as: (1) crystals corresponding to certain frequencies to be scanned are inserted in the discrete frequency-providing array 34; (2) the particular channels to be scanned are selected by opening certain of the switches 46; and (3) the manual or automatic mode of operation is selected.

To select the particular frequencies that can be scanned by the scanning receiver 10, certain crystals 48 are inserted in the discrete frequency-providing array 34. The crystals are selected to cooperate with the scanning local oscillator common circuit 32 so that each crystal, when energized, causes the scanning local oscillator common circuit 32 to oscillate at one predetermined frequency.

To select the channels of the scanning receiver 10 that are to be scanned at a particular time, certain of the switches 46 are closed and others are opened. The closed switches select the particular frequencies that are to be scanned at that time while the open switches prevent scanning of the channel corresponding to the open switch. These switches are manual and therefore provide some choice to the operator without the necessity of changing crystals.

To select the automatic or manual mode of operation, the switch 76 in the manual-automatic selector switch 38 of the embodiment of FIG. 2 is opened for automatic operation or closed for manual operation. In the embodiment of FIG. 4, the switch 108 is closed for automatic operation and open for manual operation. When the switch 76 in the embodiment of FIG. 2 is open and the switch 108 in the embodiment of FIG. 4 is closed, the channels are scanned automatically. When the switch 76 is closed and the switch 108 is open the channels are scanned only upon depressing of the push-button switches 77 or 114.

In operation, the counter 36 scans from position to position, causing the lamps 44 to be briefly illuminated at each position and a corresponding one of the crystals 48 to be included in circuit with the scanning local oscillator common circuit 32 to provide a series of frequencies to the first mixer in the RF amplification and first mixer stages 22 of a basic radio receiver portion 12. The squelch circuit 28 of the basic radio receiver portion 12 applies a signal to the counter 36 to stop it from further scanning when a carrier corresponding to one of the scanned carrier frequencies is received, thus permitting the received signal to be processed by the IF and audio stages 24 and converted to audible sound by the speaker 26.

To cause the counter 36 to scan from position to position, 1.4 Hz. pulses from the timing circuit 14 are applied through the manual-automatic selector circuit 38 or 100 to conductor 67. The divide-by-ten binary-coded-decimal counter 68 (FIG. 2) applies static potentials to appropriate ones of the output conductors 45A–45D each time a pulse is receive through the conductor 67 on its count-input terminal at a frequency of approximately 1.4 pulses, maintaining the static potentials for 66 milliseconds. The output of the divide-by-ten counter 68 which is binary-coded decimal in form, is applied to the binary-coded-decimal to decimal decoder 66 resulting in a pulse being applied to successive output conductors of the decoder 66 to energize successive ones of the channels 40A–40E (FIG. 1) at a frequency of 1.4 Hz. and a pulse width of 66 milliseconds.

In the manual mode of operation with the switch 76 of the manual-automatic selector switch 38 is closed or the switch 108 of the manual-automatic selector switch 100 open in the embodiments of FIGS. 2 or 4 respectively, the switches 77 and 79 are open, the switch 78 is closed in the embodiment of FIG. 2 and the switch 114 is open in the embodiment of FIG. 4, causing pulses of approximately 0.3 pulses per second from the timing circuit 14 in the embodiment of FIG. 2 and a D.C. potential in the embodiment of FIG. 4 to be applied to the push-button switch 77 or 114.

With the switch 76 closed and the switches 77 and 79 open in the embodiment of FIG. 2, the squelch control circuit 28 is connected to the input of the timing circuit 14 and does not affect the scanning of the counter 36 since the input impedance of the timing circuit 14 is greater than the output impedance of the squelch control circuit 28.

In the embodiment of FIG. 2, pulses are not applied to the counter 36 through the conductor 67 unless the push-button switch 77 is depressed, at which time, the 0.3 Hz. pulses from the timing circuit 14 are applied to the base of transistor 72 and transistor 74 through the switch 76, resulting in pulses on the conductor 67 which cause the counter 36 to scan from position to position in synchronism with every pulse from the timing circuit 14.

In the manual mode of operation of the embodiment of FIG. 4 with the switch 108 of the manual-automatic selector switch 100 closed and the push-button switch 114 open, timing pulses from the timing circuit 14 are blocked by the switch 108 and the potential from the source 106 is blocked by the push-button switch 114 from the Schmidt trigger 102. When the push button of the push-button switch 114 is depressed, the Schmidt trigger 102 is connected to the source 106 and generates a pulse applying it to the divide-by-ten counter 68 to cause the scanning receiver to move one channel position each time the push button of the push-button switch 114 is depressed. The timing circuit 14 in the embodiment of FIG. 4 generates pulses at all times at the frequency of 1.4 Hz. since it is not necessary to slow the repetition rate in this embodiment.

In the automatic mode of operation with the switch 76 of the embodiment of FIG. 2 open, the switch 79 is normally closed and the switches 78 and 77 are normally open, causing 1.4 Hz. pulses to be applied from the timing circuit 14 to the base of the transistor 72. Similarly, in the embodiment of FIG. 4, the switch 108 is closed to pass 1.4 Hz. pulses to the collector and a signal from the squelch control circuit 28 to the base of the transistor 112. When no signal is being received at a frequency scanned by the scanning radio 10, the squelch control circuit 28 applies a positive potential to the transistor 74 or 112 so that as each pulse reaches the base of the transistor 72 or the collector of the transistor 112, a pulse is applied to the conductor 67, causing the counter 36 to scan from channel to channel in synchronism with each pulse from the timing circuit 14.

When a signal is received by the scanning radio 10, the squelch circuit 28 biases the base of the transistor 74 or the base of the transistor 112 negatively, causing the transistor to be cut off and interrupting the pulses applied to conductor 67, thus locking the receiver on the one of the channels 40A–40E which is cooperating with the local oscillator common circuitry 32 to generate a frequency at the received carrier frequency.

To apply each of the selected frequencies to the mixer within the RF amplification and first mixer stages 22 as the counter 36 scans from position to position, the counter 36 grounds in succession one end of each of the channels 40A–40E, thus grounding one contact of each of the lockout switches 46A–46E. This causes a positive potential within the scanning local oscillator common circuit 32 to be applied across each of the successive crystals 48A–48E, and 47K resistors 43A–43E through the switching diodes 42A–42E in succession for any channels in which the lockout switches 46A–46E are closed.

As the succession of channels 40A–40E are energized, the Colpitts oscillator 64 (FIG. 2) oscillates at a corresponding succession of frequencies controlled by the crystals 48A–48E and the opened or closed position of the switches 46A–46E. Of course, if the switch 46 corresponding to the stage of the counter that is grounded has been opened, this frequency is not provided to the mixer and scanning continues even if a carrier frequency is received by the antenna 20 (FIG. 1) at that frequency.

To indicate the channel being scanned or upon which a signal is being received, a circuit is completed for the energized stage of the dividing counter from the timing circuit 14 through the conductor 50 and to ground through the closed switches 46A–46E at the energized stage of the dividing counter. This causes 6 millisecond duration pulses to be applied to a selected one of the LED lamps 44A–44E at a 1.4 Hz. rate while that stage of the counter is selected or while that corresponding channel is receiving a signal. The pulsing of the lamps 44A–44E for short 6 millisecond durations conserves power and enables the portable scanning radio to be energized for a longer period of time by the same battery without recharging.

When a carrier signal is received on the antenna 20 corresponding to the frequency selected by the scanning local oscillator, an IF signal is provided by the first mixer in the RF amplification and first mixer stage 22 to the second mixer in the IF and audio stage 24, with a resulting audio signal from the second mixer being applied to the audio stages for detection. The detected and amplified audio signal results in an audible signal from the speaker 26 and the signal from the squelch control circuit 28, with the signal from the squelch control circuit 28 being applied to the transistors 74 or 112 to terminate the scan, thus holding the receiver on the channel receiving a signal.

To provide the 6 millisecond duration timing pulses to the RF amplification and first mixer stages 22 and the IF stages for pulsed operation of these components in one embodiment of the receiver, timing pulses are connected to the transistor 89 through conductor 50 (FIG. 3) and OR gate 88 in the power switch 52 from the timing circuit 14. The OR gate 88 in the switch 52 applies power pulses at 1.4 Hz. and 6 milliseconds duration to the RF amplification and first mixer stages 22 and to the IF stage through conductor 90 to pulse these components and thus save power during scanning. The discriminator and squelch circuit apply signals to the noise detector 86 through conductors 29 and 30, causing it to drive transistors 89 and 91 to conduction when a carrier signal is received so as to maintain all components of the radio energized, other than unselected channels and the LED's, with the noise detector 86 holding the audio amplifier off until a carrier signal is received through conductor 93.

The pulsing of components of the receiver conserves power from the battery in a portable receiver and enables it to continue for a longer period of time and the use of a common timing circuit 14 to pulse both lamps and the IF and audio stages 24 is economical of circuitry and power.

From the above description, it can be understood that this scanning receiver has several advantages such as: (1) it is inexpensive in construction because the timing circuit 14 is able to control not only the scanning of the counter 36 but also other logic functions during the scanning, such as for example, the pulsing of the lamps 44 and the power switch 52; (2) it is economical of power because the lamps, RF and IF stages are pulsed, and the audio amplifier held off until a carrier signal is received, thus permitting a portable unit to have a relatively long battery life; (3) it is not necessary to use power transistors for the switching operations in the scanning circuit; and (4) in the manual mode, the generation of scanning pulses does not cause spurious switching because, in one embodiment, the Schmidt trigger saturates on the first pulse applied to it and thus does not pass subsequent noise pulses that follow before the Schmidt trigger returns to its initial state; and in another embodiment, manual scanning is at a slow rate after a push button is depressed, thus reducing the effects of contact bounce.

Although a preferred embodiment has been described with some particularity, many modifications and variations in the invention are possible in the light of the above teachings. Therefore, it is to be understood that, within the scope of the appended claims, the invention may be practiced other than as specifically described.

What is claimed is:

1. A radio receiver comprising means for receiving radio frequency electrical energy and signal processing means for selecting certain wavelengths of said radio frequency electrical energy and for producing audio intelligence from said wavelengths of radio frequency electrical energy, said signal processing means comprising:

a plurality of pulse-controlled circuits for intermittent operation upon the application of electrical pulses;

a pulse generator;

means for connecting said pulse generator to certain of said plurality of pulse-controlled circuits during at least a portion of the operation of said radio receiver, whereby certain portions of said radio receiver operate intermittently so as to conserve power;

variable tuning means for selecting certain wavelengths of said radio frequency electrical energy;

said variable tuning means comprising at least one mixer;

variable frequency oscillator means for applying any one of several different frequencies to said mixer, whereby certain wavelengths of said radio frequency energy are selected;

a counter for providing counts represented by output potential levels on counter output terminals; and scan-control means for preventing counting of said counter while said radio receiver is receiving electrical energy at one of said certain wavelengths;

said variable frequency oscillator means including means for applying signals of said different frequencies to said mixer in response to corresponding counts of said counter;

said pulse generator being electrically connected to said counter whereby said counter is counted by said pulse generator to cause variable frequency oscillator means to apply a series of different frequencies to said mixer in response to said output potential levels;

said pulse generator including pulse means for applying a series of pulses of predetermined duration to at least some of said pulse-controlled circuits, which predetermined durations are less than the durations of certain of said output potential levels;

said pulse-controlled circuits including a plurality of lamps;

each of said lamps indicating a different one of certain of said selected frequencies, whereby said lamps are illuminated to indicate the frequency being scanned for a period of time shorter than the time said counter is at a corresponding stage;

each of said lamps including first and second terminals;

each of said first terminals being electrically connected to said pulse means for applying a series of pulses of predetermined durations to at least some of said pulse-controlled circuits, whereby pulses having a duration less than the duration of certain of the output potential levels are applied to said first terminal of said certain of said lamps;

each of said second terminals of said certain lamps being electrically connected to a different one of said counter output terminals, whereby a circuit is completed from the pulse means and a selected counter output terminal for said duration less than the duration of certain of the output potential levels.

2. A radio receiver according to claim 1 in which said variable tuning means further includes:

manual scanning means for selecting manual operation of said radio receiver;

said manual means having its output electrically connected to said counter and its input electrically connected to said pulse generator;

said manual means including manual-automatic switch means having a first position and a second position and push-button switch means having a first position and a second position;

said manual means further including means for electrically disconnecting said pulse generator from said counter without disconnecting said pulse generator from at least certain of said pulse-controlled circuits while both said manual-automatic switch means and said push-button switch means are in said first position and electrically connecting said pulse generator to said counter when said manual-automatic switch means is in said second position and said radio receiver is not receiving electrical energy of any of said certain wavelengths, whereby said counter counts continuously while said manual-automatic switch means is in said second position and said radio is not receiving radio frequency energy at any of said certain wavelengths and counts only upon the switching of said push-button switch means to said first position from said second position while said manual-automatic switch means is in said second position.

3. A radio receiver according to claim 2 in which said push-button switch means includes means for applying a single pulse to said counter whenever said push-button switch means is switched from said first position to said second position.

4. A radio receiver according to claim 2 in which said push-button switch means includes means for applying pulses from said pulse generator to said counter at a slower repetition rate when said push-button switch means is in said second position and said manual-automatic switch means is in said first position than said manual means applies to said counter when said manual automatic switch means is in said second position.

5. A radio receiver according to claim 2 in combination with battery power means adapted to provide electrical power from a battery to the radio receiver in which:

said certain pulse-controlled circuits include at least one or more of RF amplification stage, IF amplification stage and first and second mixers;

said signal processing means further comprises an audio stage for amplifying audio signals;

noise detector means for applying power from said battery power means to said audio stage, and one or more of said RF amplification stage, IF amplification stage and first and second mixers when a carrier is detected and for blocking power from said audio stage, and one or more of said RF amplification stage, IF amplification stage and first and second mixers in the absence of a detected carrier signal;

said gate means for connecting including gate means for electrically connecting said pulse means to one or more of said RF amplification stage, IF amplification stage and first and seconnd mixers; and said pulse means includes the power source for at least one of the RF, IF and audio stages.

6. A radio receiver according to claim 5 in which:

said signal processing means includes a discriminator having a first and second discriminator output means;

said discriminator including means for energizing said first discriminator output means when a carrier signal is detected and said second discriminator output means when a carrier signal is not detected;

said noise detector means being a bistable device having a set input terminal electrically connected to the first discriminator output means and a reset input terminal electrically connected to the second discriminator output means.

7. A radio receiver according to claim 1 in which said lamps are LED lamps.

8. A radio receiver according to claim 1 in combination with battery power means adapted to provide electrical power from a battery to the radio receiver in which:

said certain pulse-controlled circuits include at least one or more of RF amplification stage, IF amplification stage and first and second mixers;

said signal processing means further comprising an audio stage for amplifying audio signals; and noise detector means for applying power from said battery power means to said audio stage, and one or more of said RF amplification stage, IF amplification stage and first and second mixers when a carrier is detected and for blocking power from said audio stage, and one or more of said RF amplification stage, IF amplification stage and first and second mixers in the absence of a detected carrier signal;

said means for connecting including gate means for electrically connecting said pulse means to one or more of said RF amplification stage, IF amplification stage and first and,second mixers; and said pulse means includes the power source for at least one of the RF, IF and audio stages.

9. A radio receiver according to claim 8 in which:

said signal processing means includes a discriminator having a first and second discriminator output means;

said discriminator including means for energizing said first discriminator output means when a carrier signal is detected and said second discriminator output means when a carrier signal is not detected;

said noise detector means being a bistable device having a set input terminal electrically connected to the first discriminator output means and a reset input terminal electrically connected to the second discriminator output means.

* * * * *